(12) United States Patent
Bookbinder et al.

(10) Patent No.: US 8,849,082 B2
(45) Date of Patent: Sep. 30, 2014

(54) LOW BEND LOSS OPTICAL FIBER

(71) Applicants: Dana Craig Bookbinder, Corning, NY (US); Ming-Jun Li, Horseheads, NY (US); Pushkar Tandon, Painted Post, NY (US); James Andrew West, Painted Post, NY (US)

(72) Inventors: Dana Craig Bookbinder, Corning, NY (US); Ming-Jun Li, Horseheads, NY (US); Pushkar Tandon, Painted Post, NY (US); James Andrew West, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 145 days.

(21) Appl. No.: 13/677,379

(22) Filed: Nov. 15, 2012

(65) Prior Publication Data

US 2013/0136406 A1 May 30, 2013

Related U.S. Application Data

(60) Provisional application No. 61/564,455, filed on Nov. 29, 2011.

(51) Int. Cl.
*G02B 6/028* (2006.01)
*G02B 6/036* (2006.01)
*G02B 6/02* (2006.01)

(52) U.S. Cl.
CPC .............. *G02B 6/028* (2013.01); *G02B 6/0281* (2013.01); *G02B 6/0365* (2013.01); *G02B 6/03666* (2013.01); *G02B 6/02395* (2013.01)
USPC ........... 385/124; 385/123; 385/125; 385/126; 385/127; 385/128

(58) Field of Classification Search
CPC .............. G02B 6/0365; G02B 6/0288; G02B 6/02019; G02B 6/02109
USPC .................. 385/123, 124, 125, 126, 127, 128
See application file for complete search history.

(56) References Cited

U.S. PATENT DOCUMENTS

| 6,477,305 | B1 | 11/2002 | Berkey et al. | |
|---|---|---|---|---|
| 6,731,847 | B1 * | 5/2004 | Kato et al. | ..................... 385/127 |
| 6,904,772 | B2 | 6/2005 | Berkey et al. | |
| 6,944,382 | B2 | 9/2005 | Berkey et al. | |
| 7,076,141 | B2 | 7/2006 | Berkey et al. | |
| 7,187,833 | B2 | 3/2007 | Mishra | |

(Continued)

FOREIGN PATENT DOCUMENTS

WO    WO01/47822    7/2001

OTHER PUBLICATIONS

M. Li et al., "Optical Transmission Fiber Design Evolution," Journal of Lightwave Technology, vol. 26, No. 9, May 1, 2008.

(Continued)

*Primary Examiner* — Jennifer Doan
(74) *Attorney, Agent, or Firm* — Svetlana Short

(57) ABSTRACT

An optical fiber comprising: (I) a germania doped central core region having outer radius $r_1$ and (II) a maximum relative refractive index $\Delta_{1max}$ and a cladding region including (i) a first inner cladding region having an outer radius $r_2 > 5$ microns and refractive index $\Delta_2$; (ii) a and a second inner cladding region having an outer radius $r_3 > 9$ microns and comprising refractive index $\Delta_3$; and (iii) an outer cladding region surrounding the inner cladding region and comprising refractive index $\Delta_4$, wherein $\Delta_{1max} > \Delta_4$, $\Delta_2 > \Delta_3$, and wherein $0.01\% \leq \Delta_4 - \Delta_3 \leq 0.09\%$, said fiber exhibits a 22 m cable cutoff less than or equal to 1260 nm, and $0.25 \leq r_1/r_2 \leq 0.85$.

25 Claims, 2 Drawing Sheets

(56) References Cited

U.S. PATENT DOCUMENTS

| | | |
|---|---|---|
| 7,450,807 B2 | 11/2008 | Bickham et al. |
| 7,565,820 B2 | 7/2009 | Foster et al. |
| 7,620,282 B2 | 11/2009 | Bickham et al. |
| 7,676,129 B1 | 3/2010 | Bookbinder et al. |
| 7,702,205 B2 * | 4/2010 | Kumano ................. 385/127 |
| 7,715,675 B2 | 5/2010 | Fabian et al. |
| 7,899,293 B2 | 3/2011 | de Montmorillon et al. |
| 7,903,917 B2 | 3/2011 | Bickham et al. |
| 7,995,889 B2 | 8/2011 | de Montmorillon et al. |
| 2008/0124028 A1 | 5/2008 | Bickham et al. |
| 2011/0064368 A1 | 3/2011 | Bookbinder et al. |

OTHER PUBLICATIONS

Single Mode Fiber Optics, Jeunhornme, pp. 39-44, Marcel Dekker, New York, 1990.

Mar. 22, 2013 International Search Report issued in counterpart application PCT/US2012/066718.

* cited by examiner

LOW BEND LOSS OPTICAL FIBER

CROSS-REFERENCE TO RELATED APPLICATIONS

This application claims the benefit of priority under 35 U.S.C. §119 of U.S. Provisional Application Ser. No. 61/564,455 filed on Nov. 29, 2011 the content of which is relied upon and incorporated herein by reference in its entirety.

BACKGROUND

1. Field

The disclosure relates generally to optical fibers having low bend losses.

2. Technical Background

There is a need for low bend loss optical fibers, particularly for optical fibers utilized in so-called "access" and fiber to the premises (FTTx) optical networks. Optical fiber can be deployed in such networks in a manner which induces bend losses in optical signals transmitted through the optical fiber. Some applications that can impose physical demands, such as tight bend radii, compression of optical fiber, etc., that induce bend losses include the deployment of optical fiber in optical drop cable assemblies, distribution cables with Factory Installed Termination Systems (FITS) and slack loops, small bend radius multiports located in cabinets that connect feeder and distribution cables, and jumpers in Network Access Points between distribution and drop cables. It has been difficult in some optical fiber designs to simultaneously achieve low bend loss, low cable cutoff wavelength, and a zero dispersion wavelength between 1300 nm and 1324 nm.

More specifically, it is known that standard single mode fibers that are G.652 standards compliant also have microbend loss when deployed in cable. In order to mitigate this loss, polymer coatings with a low primary modulus may be used to reduce the microbend loss to manageable level. These coatings are typically expensive. One alternate method of reducing micro-bending and macro-bending losses in single moded fiber is to use a down-doped trench situated in contact with fiber core, as part of the fiber profile. However, putting a trench in the profile can negatively impact other optical properties like fiber cable cutoff and dispersion.

No admission is made that any reference cited herein constitutes prior art. Applicant expressly reserves the right to challenge the accuracy and pertinency of any cited documents.

SUMMARY

One embodiment of the disclosure relates to a single mode optical fiber comprising: (I) a central core region having outer radius $r_1$ and refractive index $\Delta_1$, with a maximum refractive index $\Delta_{1max}$ and an alpha ($\alpha$) profile where $1 \leq \alpha \leq 100$; (II) a cladding region comprising (a) a first inner cladding region having outer radius $r_2$ and refractive index $\Delta_2$; (b) a second inner cladding region having outer radius $r_3$ and refractive index $\Delta_3$; and (c) a outer cladding region having refractive index $\Delta_4$, wherein $\Delta_3<\Delta_4$ and $\Delta_3<\Delta_2$, and $r_1/r_2$ is greater than 0.25 and less than 0.95. Preferably, $r_1/r_2$ is greater than 0.3, and most preferably $0.33<r_1/r_2<0.85$.

According to some embodiments an optical fiber comprises:
a germania doped central core region having outer radius $r_1$ and refractive index $\Delta_1$, with a maximum refractive index $\Delta_{1max}$ and an alpha ($\alpha$) profile where $1 \leq \alpha \leq 100$, a cladding region comprising (i) a first inner cladding region having an outer radius $r_2>6$ microns and refractive index $\Delta_2$; (ii) a second inner cladding region having an outer radius $r_3>9$ microns and comprising refractive index $\Delta_3$; and (iii) an outer cladding region surrounding the inner cladding region and comprising refractive index $\Delta_4$, wherein $\Delta_{1max}>\Delta_4$, $\Delta_2>\Delta_3$, and $0.01\% \leq \Delta_4-\Delta_3 \leq 0.09\%$, said fiber exhibits a 22 m cable cutoff less than or equal to 1260 nm, and $r_1/r_2$ is greater or equal to 0.25. According to some embodiment the outer cladding region is updoped relative to pure silica. According to some embodiments the second inner cladding region contains less than 0.02 wt. % fluorine. According to some embodiments the second inner cladding region is essentially free of fluorine and germania. Preferably, according to some embodiments, the absolute value $V_3$ of the second inner cladding region is $5\%\mu m^2 \leq V_3 \leq 40\%\mu m^2$.

According to some embodiments an optical fiber comprises:
a germania doped central core region having outer radius $r_1$ and refractive index $\Delta_1$, with a maximum refractive index $\Delta_{1max}$ and an alpha ($\alpha$) profile where $1 \leq \alpha \leq 100$, and a cladding region comprising (i) a first inner cladding region having an outer radius $r_2>6$ microns and refractive index $\Delta_2$ and $0.3 \leq r_1/r_2 \leq 0.85$; (ii) and a second inner cladding region having an outer radius $r_3>9$ microns and comprising refractive index $\Delta_3$; and (iii) an outer cladding region surrounding the inner cladding region and comprising refractive index $\Delta_4$, wherein $\Delta_{1max}>\Delta_4$, $\Delta_2>\Delta_3$, $\Delta_3<\Delta_4$, and $0.01\% \leq \Delta_4-\Delta_3 \leq 0.09\%$, and $\Delta_2-\Delta_3 \geq 0.01\%$, the absolute value $V_3$ of the second inner cladding region is $5\%\mu m^2 \leq V_3 \leq 40\%\mu m^2$, said fiber exhibits a 22 m cable cutoff less than or equal to 1260 nm, and has a zero dispersion wavelength $\lambda_o$ and $1300\ nm \leq \lambda_o \leq 1324\ nm$.

According to some embodiments an optical fiber comprises:
a germania doped central core region having outer radius $r_1$ and refractive index $\Delta_1$, with a maximum refractive index $\Delta_{1max}$ and an alpha ($\alpha$) profile where $1 \leq \alpha \leq 100$, and a cladding region comprising (i) a first inner cladding region having an outer radius $r_2>6$ microns and refractive index $\Delta_2$ and $0.3 \leq r_1/r_2 \leq 0.85$; (ii) and a second inner cladding region having an outer radius $r_3>9$ microns and comprising refractive index $\Delta_3$; and (iii) an outer cladding region surrounding the inner cladding region and comprising refractive index $\Delta_4$, wherein $\Delta_{1max}>\Delta_4$, $\Delta_2>\Delta_3$, $\Delta_3<\Delta_4$, and $0.01\% \leq \Delta_4-\Delta_3 \leq 0.09\%$, and $0.20\% \geq \Delta_2-\Delta_3 \geq 0.01\%$, the absolute value $V_3$ of the second inner cladding region is $5\%\mu m^2 \leq V_3 \leq 40\%\mu m^2$, said fiber exhibits a 22 m cable cutoff less than or equal to 1260 nm, and has a zero dispersion wavelength $\lambda_o$ and $1300\ nm \leq \lambda_o \leq 1324\ nm$.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
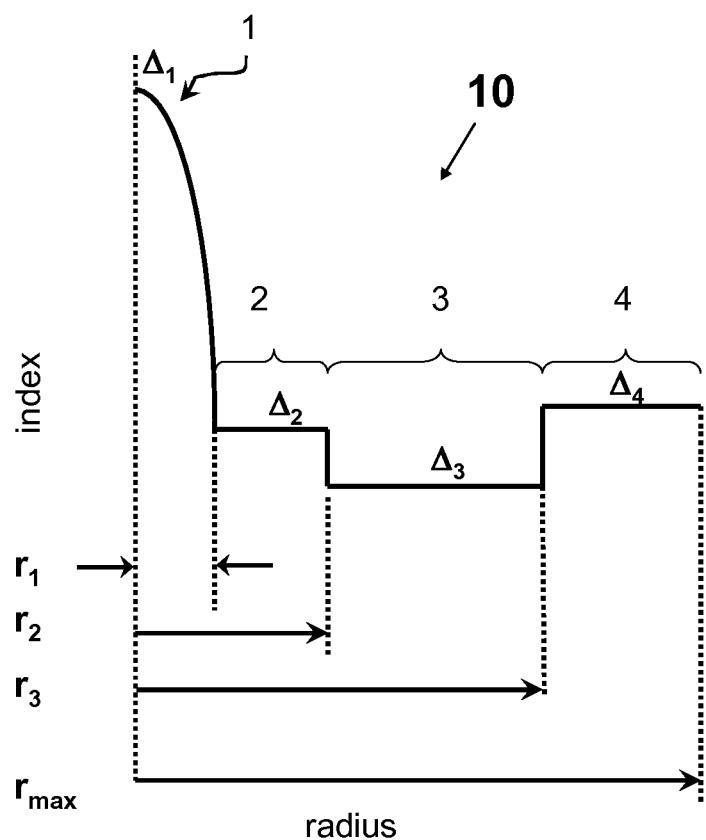
FIG. 1 is a schematic relative refractive index profile of one embodiment of the optical fiber.

Additional features and advantages will be set forth in the detailed description which follows and will be apparent to those skilled in the art from the description or recognized by practicing as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, and as used herein $n_c$ is the average refractive index of the outer cladding. As used herein, the relative refractive index is represented by $\Delta$ and its values are given in units of "%", unless otherwise specified. The terms relative refractive index delta, % $\Delta$, $\Delta$, % and $\Delta$% refer to percent delta index and can be used interchangeably herein. In cases where the refractive index of a region is less than the average refractive index of the outer cladding region, the relative index percent is negative and is referred to as having a depressed region or depressed index. In cases where the refractive index of a region is greater than the average refractive index of the outer cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$, $Al_2O_3$, $P_2O_5$, $TiO_2$, Cl, Br. Examples of down dopants include fluorine and boron.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff} = 2\pi (\int f^2 r dr)^2 / (\int f^4 r dr),$$

where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "$\alpha$-profile" refers to a relative refractive index profile, expressed in terms of refractive index delta $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)$ % is zero, and r is in the range $r_i \leq r \leq r_f$, where $\Delta$ is defined above, $r_i$ is the initial point of the $\alpha$-profile, $r_f$ is the final point of the $\alpha$-profile, and $\alpha$ is an exponent which is a real number. Radial distance from the center of the optical fiber described herein is represented as "r" or "R".

The mode field diameter (MFD) is measured using the Peterman II method wherein, $2w = MFD$, and $w^2 = (2 \int f^2 r dr / \int [df/dr]^2 r dr)$, the integral limits being 0 to $\infty$.

One type of bend test is the lateral load microbend test. In this so-called "lateral load" test (LLWM), a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 Newtons. A 70 Newton force is then applied to the plates and the increase in attenuation in dB/m is measured. The increase in attenuation is the lateral load attenuation of the waveguide in dB/m at a specified wavelength (typically with in the range of 1200-1700 nm, e.g., 1310 nm or 1550 nm or 1625 nm). Percent improvement (reduction) in LLWM is calculated as follows: $[LLWM_{(comparative\ example)} - LLWM_{(inventive\ example)} / LLWM_{(comparative\ example)}] \cdot 100\%$.

Another type of bend test measures fiber attenuation due to macrobending. More specifically, the bend resistance of a waveguide fiber can be gauged by induced attenuation under prescribed test conditions, for example by deploying or wrapping the fiber around a mandrel of a prescribed diameter, e.g., by wrapping 1 turn around a either a 10 mm, 20 mm or 30 mm or similar diameter mandrel (e.g. "1×10 mm diameter macrobend loss" or the "1×20 mm diameter macrobend loss") and measuring the increase in attenuation per turn.

The "pin array" bend test is used to compare relative resistance of waveguide fiber to macrobending losses. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm During testing, sufficient tension is applied to make the waveguide fiber conform to a portion of the pin surface. The increase in attenuation is the pin array attenuation in dB of the waveguide at a specified wavelength (typically with in the range of 1200-1700 nm, e.g., 1310 nm or 1550 nm or 1625 nm). Percent improvement (reduction) in Pin Array is calculated as follows: $[Pin\ Array_{(comparative\ example)} - Pin\ Array_{(inventive\ example)} / Pin\ Array_{(comparative\ example)}] \cdot 100\%$.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards.

The ratio of MFD at 1310 nm to Cable Cutoff wavelength (MFD at 1310 nm/Cable Cutoff wavelength in microns) is defined herein as MACC.

Unless otherwise noted herein, optical properties (such as dispersion, dispersion slope, etc.) are reported for the LP01 mode.

A trench (depressed index region) in the refractive index profile of the SM (single mode) optical fiber also impacts other optical properties like fiber cable cutoff wavelength and dispersion. The following fiber embodiments have an offset trench and result in low microbend single mode fibers that and other opticals that are G.652 compliant. (MFD between 8.2 and 9.6 microns and typically is greater than 9 microns at 1310 nm, zero dispersion wavelength ($\lambda_0$) between 1300 and 1324 nm, cable cutoff wavelength less than or equal to 1260 nm). The trench disclosed in the fiber's refractive index profile is offset to the core region, with the trench being made either by down-doping the trench, or by updoping the overclad relative to the trench. The offset trench allows new fiber designs with more control of the dispersion properties. Preferably, the trench index ($\Delta_3$) with respect to the overclad (the outer most cladding layer) is as follows: $0.01\% \leq \Delta_4 - \Delta_3 \leq 0.09\%$, with the absolute volume of the trench $V_3$ is between about 5 and 30 Exemplary optical fibers disclosed herein are capable of microbending loss (as defined by lateral load measurement, LLWM) that is greater than 5% more preferred greater than 15% and up to about 75% lower than the corresponding loss in non-trench fibers. Use of glass fibers that have lower microbending loss allows for use of lower cost primary coatings in optical fiber processing (typically the lower cost primary coatings have higher moduli for example greater than 0.7 MPa, or ≥0.8 MPa, or even ≥1 MPa) thus, the higher moduli primary coatings do not provide as good of microbend performance), while dispersion is controlled such that zero dispersion wavelength is 1300 nm ≤ $\lambda_o$ ≤ 1324 nm. The first inner cladding (region 2) comprising $\Delta_2$ from radius $r_1$ to $r_2$ and where $\Delta_2 - \Delta_3 \geq 0.01\%$ enables optical fiber designs with improved microbending performance to have dispersion properties which are G.652 standards compliant (1300 nm ≤ $\lambda_o$ ≤ 1324 nm). Comparative Fiber designs (without the inventive inner cladding region) with similar design parameters of $\Delta_1$ and $r_1$, and $5\%\mu m^2 \leq V_3 \leq 40\%\mu m^2$ can have $\lambda_o \leq 1300$ nm, thus making the fiber not G.652 standards compliant.

Optical fibers disclosed herein are capable of exhibiting an effective area, $A_{eff}$, at a wavelength of 1550 nm which is greater than about 55 $\mu m^2$, preferably between 55 and 95 $\mu m^2$, even more preferably between 65 and 95 $\mu m^2$. In some preferred embodiments, the optical effective area at 1550 nm is between about 70 and 95 $\mu m^2$.

Figure 2:
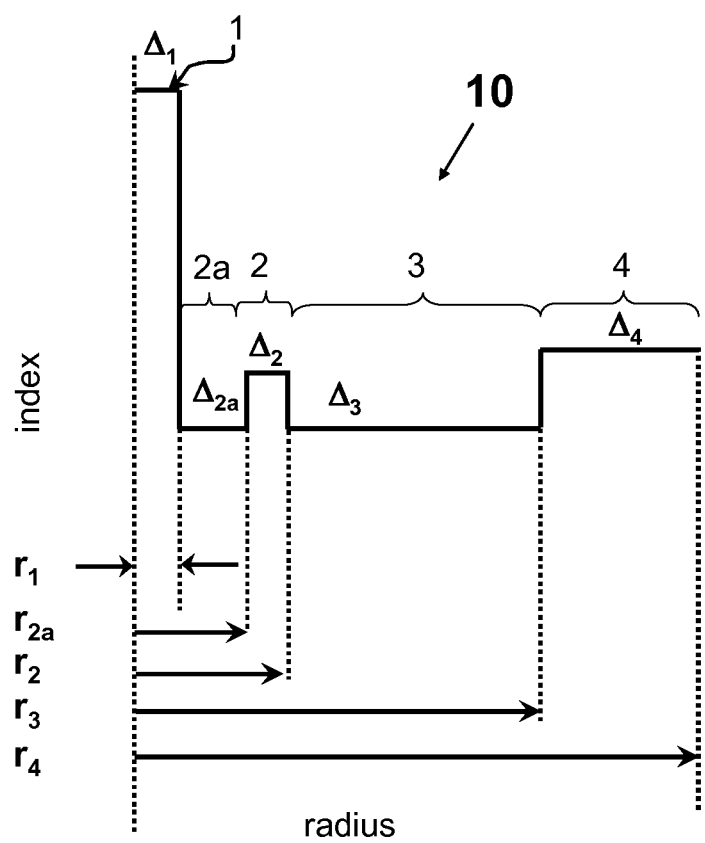
FIG. 2 is a schematic relative refractive index profile of another embodiment of the optical fiber.

One refractive index profile of an exemplary fiber 10 is shown in FIG. 1. This optical fiber includes a central glass core region 1 comprising refractive index $\Delta_1$ and a maximum refractive index delta percent $\Delta_{1max}$ The core region 1 of exemplary embodiments described herein has an alpha value $1 \leq \alpha \leq 100$, in some embodiments $1 \leq \alpha \leq 20$, in some other preferred embodiments $1 \leq \alpha \leq 6$. A first inner cladding region 2 surrounds central core region 1, the first inner cladding region 2 comprising refractive index delta percent $\Delta_2$. A second inner cladding region 3 surrounds central core region 1, the second inner cladding region 3 comprising refractive index delta percent $\Delta_3$. An outer cladding region 4 surrounds second inner cladding region 3 and comprises refractive index delta percent $\Delta_4$. As shown in FIG. 1, the second inner cladding region 3 is offset from the core region 1, such that the first inner cladding region 2 is sandwiched between the central glass core region 1 and the second inner cladding region 3. Outer cladding region 4 surrounds second inner cladding region 3 and comprises $\Delta_4$. In preferred embodiments, $\Delta_{1max} > \Delta_4$, $\Delta_2 > \Delta_3$ and $\Delta_3 < \Delta_4$. In the embodiment illustrated in FIG. 1, regions 1, 2, 3 are immediately adjacent one another. However, this is not required, and alternatively additional core or cladding regions may be employed. For example, an optional inner cladding region 2A may be may be directly adjacent to and surround core region 1 and comprise a higher or a lower refractive index delta percent $\Delta_{2A}$ than that of the annular region 2 (i.e., $\Delta_{2A} < \Delta_2$, or $\Delta_{2A} > \Delta_2$) as shown in FIG. 2.

Central core region 1 comprises an outer radius $r_1$ which is defined as the first radial location moving away radially outward from the $\Delta_{1max}$ corresponding to the maximum absolute slope of the refractive index of central core region 1 (that is $r=r_1$ where $|d\Delta(r)/dr|$ is maximum). Core region 1 (also referred to as a core herein) preferably exhibits a refractive index delta percent, $\Delta_{1max}$, between about 0.3 to 0.5%, more preferably between about 0.32 to 0.45%. In some embodiments, $\Delta_{1max}$ is preferably between 0.33 to 0.43%. Core radius $r_1$ is preferably between 3 and 8 microns, in some embodiments between about 4 to 6.5 microns and in some embodiments between 4.2 and 6.2 microns. Central core region 1 may comprise a single segment, step index profile. Central core region 1 preferably comprises an alpha between about 1-100, and in some cases alpha may be between 15 and 40. In other embodiments core region 1 comprises an alpha between about 1-20 and still in other embodiments core region 1 comprises an alpha between about 1-6.

In the embodiment illustrated in FIG. 1, inner cladding region 2 is in contact with and surrounds central core region 1 and comprises inner radius $r_1$ and outer radius $r_2$ (the radius $r_1$ is defined above). The inner cladding region 2 comprises an outer radius $r_2$ which is defined as the first radial location moving away radially outward from $r_1$ corresponding to the maximum absolute slope of the refractive index of inner cladding region 2 (that is $r=r_2$ where $|d\Delta(r)/dr|$ is maximum). In some cases the refractive index in region 2 is essentially flat. In other cases there can be a gradient index profile. Still in other cases there can be fluctuations as a result of small profile design or process variations. In some embodiments, the inner cladding region 2 comprises silica which is substantially undoped with either fluorine or germania, i.e., such that the region is essentially free of fluorine and germania. The inner cladding region 2 preferably exhibits a width between about 3 to 13 microns, in some embodiments between 2.5 to 10 microns, in other embodiments between about 3 to 7 microns. The ratio of the core radius $r_1$ over the inner cladding region 2 radius $r_2$ is preferably at least 0.3 and less than 1, more preferably greater than 0.3, for example, between about 0.33 and 0.85 or between 0.4 to 0.6. It is noted that another annular region or regions (not shown) may be situated between the inner cladding region 2 and the core.

In the embodiment illustrated in FIG. 1, the second inner cladding region 3 (also referred to as a trench herein) surrounds the first inner cladding region 2 and comprises inner radius $r_2$ and outer radius $r_3$, $r_2$ being defined as above and $r_3$ being defined as where the refractive index profile curve crosses the zero delta line ($\Delta_4$) at the first radial location moving away radially outward from $r_2$. In some cases the refractive index in region 3 is essentially flat. In other cases there region 3 may have a gradient index profile. Still in other cases there can be fluctuations as a result of small profile design or process variations. In some embodiments, the inner cladding region 3 comprises silica which is substantially undoped with either fluorine or germania, i.e., such that the region is essentially free of fluorine and germania. Inner cladding region 3 comprises refractive index delta percent $\Delta_3$ which is calculated using:

$$\Delta_3 = \int_{r2}^{r3} \Delta(r) dr / (r_3 - r_2) \qquad \text{Eq. 1}$$

The volume $V_3$ of the second inner cladding annular region 3, is defined herein as shown in Equation 2 and given in units of percent delta index times microns (%μm²):

$$V_3 = 2 \int_{r2}^{r3} \Delta_{(4-3)}(r) r\, dr \qquad \text{Eq. 2}$$

In the embodiments of FIG. 1 the absolute volume $V_3$ of the inner cladding region 3 is 4%μm²≤$V_3$≤40%μm², preferably 5%μm²≤$V_3$≤30%μm², in some embodiments the volume $V_3$ is 5%μm²≤$V_3$≤20%μm². The inner cladding region 3 preferably exhibits a width between about 5 to 20 microns, more preferably 5 to 15 microns, even more preferably between about 5 to 12 microns. The ratio of the radius $r_3$ over the inner cladding region 2 radius $r_2$ is preferably greater than 1.3, more preferably between 1.4 and about 2.5, for example, between 1.5 and about 2.3. $R_4$ is the outermost radius of the optical fiber. In some embodiments 40 microns≤$r_4$≤80 microns, more preferably 50 microns≤$r_4$≤70 microns, even more preferred 60 microns≤$r_4$≤65 microns, and even more preferred 62 microns≤$r_4$≤63 microns. In some most preferred embodiments, $r_4$=62.5 microns.

Outer cladding region 4 surrounds the depressed annular region 3 and comprises refractive index delta percent $\Delta_4$ which is higher than the index $\Delta_3$ of inner cladding region 3, thereby forming a region which is an "updoped" outer cladding region 4 with respect to inner cladding region 3, e.g. by adding an amount of dopant (such as germania ($GeO_2$) or chlorine (Cl)) sufficient to increase the refractive index of the outer cladding region 4. Note, however, that it is not critical that region 4 be updoped in the sense that an index increasing dopant must be included in region 4. Indeed, the same sort of raised index effect in outer cladding region 4 may be achieved by down doping inner cladding region 3 with respect to outer cladding region 4. Outer cladding region 4 comprises a higher refractive index than inner cladding region 3, and preferably comprises refractive index delta percent $\Delta_4$ which is greater than 0.01%, and may be greater than 0.02% or 0.03%. That is, in these exemplary embodiments, the glass of the outer region 4 is updoped relative to pure silica. Preferably, the higher index portion (compared to inner cladding region 3) of outer cladding region 4 extends at least to the point where the optical power which would be transmitted through the optical fiber is greater than or equal to 90% of the optical power transmitted, more preferably to the point where the optical power which would be transmitted through the optical fiber is greater than or equal to 95% of the optical power transmitted, and most preferably to the point where the optical power which would be transmitted through the optical fiber is greater than or equal to 98% of the optical power transmitted. In many embodiments, this is achieved by having the "updoped" third annular region extend at least to a radial point of about 30 microns. Consequently, the volume $V_4$ of the third annular region 4, is defined herein being calculated using $\Delta_{(4-3)}$ between radius $r_3$ and $r_{30}$ (the radius at 30 microns) and thus is defined as shown in Equation 2 and given in units of percent delta index times microns² (%μm²):

$$V_4 = 2 \int_{r3}^{r30} \Delta_{(4-3)}(r) r\, dr \qquad \text{Eq. 3}$$

The volume $V_4$ of the outer cladding region (inside 30 microns) compared to that of the inner cladding region 3, is preferably greater than 5%μm², more preferably greater than 7% %μm², and may be greater than 10%μm². This volume $V_4$ of the outer cladding region (inside 30 microns) is in some embodiments less than 80%μm².

It is noted that another annular cladding region (not shown) may be situated between the outer cladding region 4 and the inner cladding region 3.

In some embodiments, the refractive index $\Delta_4$ of the outer cladding region 4 is greater than 0.01%, more preferably greater than 0.02%, when compared to that of the inner cladding region 3. In some embodiments, the outer cladding region 4 comprises chlorine (Cl) in an amount greater than 1000 ppm, more preferably greater than 1500 ppm, and most preferably greater than 2000 ppm (0.2%) by weight. In some embodiments 2000 ppm (wt.)≤Cl≤12,000. In other embodiments 2000 ppm (wt.)≤Cl≤6,000.

The core region 1 preferably has a positive refractive index throughout. The core 1 comprises a maximum relative refractive index $\Delta_{1max}$ occurring between r=0 and r=3 μm. $\Delta_{1max}$ is preferably greater than 0.3, and more preferably 0.33%≤$\Delta_{1max}$≤0.42%.

The inner cladding region 2 preferably has a substantially constant relative refractive index profile, i.e. the difference between the relative refractive index at any two radii within the intermediate region is less than 0.02%, and in some preferred embodiments less than 0.01%. Thus, the relative refractive index profile of the inner cladding region 2 preferably has a substantially flat shape.

The core region 1 may be a step index or graded index core and may comprise an alpha (α) shape (see, for example, FIGS. 1 and 2). In preferred embodiments, the outer radius of the core, $R_1$, is preferably between 3.5 μm and 8 μm. The fibers are capable of exhibiting a bend loss of less than 0.75 dB/turn when wound upon on a 20 mm radius mandrel for fibers with MACC numbers between about 6.9 and 8.3. In some embodiments the fibers are capable of exhibiting a bend loss of less than 0.4 dB/turn when wound upon on a 20 mm radius mandrel for fibers with MACC numbers between about 6.9 and 8.3. In some embodiments the fibers are capable of exhibiting a bend loss of less than 0.3 dB/turn when wound upon on a 20 mm radius mandrel for fibers with MACC numbers between about 6.9 and 8. In some embodiments the fibers are capable of exhibiting a bend loss of less than 0.2 dB/turn when wound upon on a 20 mm radius mandrel for fibers with MACC numbers between about 6.9 and 8. A comparative example fiber having a MACC of 7.8 exhibiting a bend loss 0.5 dB/turn when wound upon on a 20 mm radius mandrel. In preferred embodiments these fibers also exhibit a bend loss at 1550 nm, when wound upon on a 30 mm diameter mandrel, of less than 0.025 dB/turn, and some fibers more preferably less than 0.003 dB/turn.

Various exemplary embodiments will be further clarified by the following examples. It will be apparent to those skilled in the art that various modifications and variations can be made without departing from the scope of the claims.

Fiber Examples 1-23

Tables 1A-1C below list characteristics of modeled illustrative examples 1-23 having a refractive index profile similar to that shown in FIG. 1. In particular, set forth below for each example is the refractive index delta $\Delta_{1max}$, alpha$_1$, and outer radius $R_1$ of the central core region 1, refractive index delta $\Delta_2$, alpha$_2$, and outer radius $R_2$ inner cladding region 2, refractive index delta $\Delta_3$ and volume $V_3$ of the inner cladding region 3, refractive index delta $\Delta_4$, $R_4$ and volume $V_4$ of the outer cladding region 4, which is calculated between inner radius $R_3$ of outer cladding region 3 and a radial distance of 30 microns (and between the refractive index $\Delta_4$ and that of $\Delta_3$). Also set forth are $r_1/r_2$, theoretical cutoff wavelength in nm of LP01 and LP11 modes, mode field diameter in microns at 1310 nm, chromatic dispersion at 1310 nm in (ps/nm/km), dispersion slope at 1310 nm in (ps/nm²/km), zero dispersion wavelength, $\lambda_0$ in (nm), mode field diameter at 1550 nm in microns, effective area at 1550 nm in microns, chromatic dispersion at 1550 nm in (ps/nm/km), dispersion slope at 1550 nm in (ps/nm²/km), attenuation at 1550 nm in dB/km, 1×20 mm diameter induced bend loss in dB per turn at 1550 nm, Cable (22 m) cutoff in (nm), MACC (MFD at 1310 nm/Cable Cutoff in microns), LLWM at 1550 nm in dB/m, LLWM % improvement vs. Comparative Example at 1550 nm, Pin Array at 1550 nm in dB, Pin Array % improvement vs. Comparative Example at 1550 nm. Preferably, the Pin Array bend loss at 1550 nm is less than 9 dB, and more preferably less than 7.5 dB. In Table 1, these properties are modeled.

TABLE 1A

| Parameter | Comparative Example | Example 1 | Example 2 | Example 3 | Example 4 | Example 5 | Example 6 | Example 7 |
|---|---|---|---|---|---|---|---|---|
| Δ1max (%) | 0.34 | 0.34 | 0.34 | 0.34 | 0.34 | 0.338 | 0.36 | 0.38 |
| R1 (micron) | 4.50 | 4.50 | 4.55 | 4.55 | 4.55 | 4.65 | 4.50 | 4.40 |
| Alpha-1 | 20 | 20 | 20 | 20 | 20 | 20 | 20 | 20 |
| R2 (micron) | 4.5 | 10 | 10 | 10 | 10 | 14 | 10 | 10 |
| R1/R2 | 1.00 | 0.45 | 0.46 | 0.46 | 0.46 | 0.33 | 0.45 | 0.44 |
| Δ2 (%) | 0.00 | 0.00 | 0.00 | 0.00 | 0.00 | −0.02 | 0.00 | 0.00 |
| Alpha-2 | not applicable | 20 | 20 | 20 | 20 | 20 | 20 | 20 |
| R3 (micron) | 4.5 | 16 | 16 | 20 | 20 | 20 | 20 | 20 |
| Δ3 (%) | 0.00 | −0.05 | −0.09 | −0.09 | −0.05 | −0.07 | −0.05 | −0.05 |
| V3 (% micron², in absolute magnitude) | 0 | 7.8 | 14.0 | 27.0 | 15.0 | 14.3 | 15.0 | 15.0 |
| Δ4 (%) | 0.00 | 0.00 | 0.00 | 0.00 | 0.00 | 0.00 | 0.00 | 0.00 |
| V4 (% micron², in absolute magnitude) | 0.0 | 32.2 | 58.0 | 45.0 | 25.0 | 35.0 | 25.0 | 25.0 |
| R4 (micron) | 62.5 | 62.5 | 62.5 | 62.5 | 62.5 | 62.5 | 62.5 | 62.5 |
| Cutoff LP01 (nm) | 5000 | 4180 | 3372 | 3047 | 3440 | 3288 | 3558 | 3612 |
| Cutoff LP11 (nm) | 1327 | 1289 | 1292 | 1291 | 1300 | 1288 | 1324 | 1333 |
| Dispersion 1310 nm (ps/nm/km) | 0.172 | 0.508 | 0.740 | 0.743 | 0.640 | 0.866 | 0.687 | 0.562 |
| Dispersion Slope 1310 nm (ps/nm²/km) | 0.086 | 0.087 | 0.088 | 0.088 | 0.087 | 0.087 | 0.087 | 0.087 |
| Dispersion 1550 nm (ps/nm/km) | 17 | 17.49 | 17.95 | 17.97 | 17.69 | 17.86 | 17.65 | 17.43 |
| Dispersion Slope 1550 nm (ps/nm²/km) | 0.058 | 0.059 | 0.060 | 0.060 | 0.060 | 0.058 | 0.059 | 0.059 |
| Attenuation at 1550 nm (dB/km) | 0.19 | 0.19 | 0.19 | 0.19 | 0.19 | 0.19 | 0.19 | 0.19 |
| MFD 1310 nm (micron) | 9.18 | 9.17 | 9.20 | 9.20 | 9.20 | 9.15 | 9.00 | 8.78 |
| MFD 1550 nm (micron) | 10.40 | 10.34 | 10.34 | 10.34 | 10.36 | 10.26 | 10.12 | 9.86 |
| Aeff at 1550 nm (microns²) | 84.9 | 84.0 | 84.0 | 84.0 | 84.3 | 82.7 | 80.4 | 76.4 |
| LLWM at 1550 nm (dB/m) | 0.549 | 0.438 | 0.376 | 0.329 | 0.381 | 0.360 | 0.223 | 0.138 |
| Pin Array at 1550 nm (dB) | 9.16 | 8.18 | 6.94 | 6.02 | 6.79 | 6.89 | 3.78 | 2.32 |
| LLWM % improvement vs. Comparative Example at 1550 nm | 0 | 20 | 32 | 40 | 31 | 34 | 59 | 75 |
| Pin Array % improvement vs. Comparative Example at 1550 nm | 0 | 11 | 24 | 34 | 26 | 25 | 59 | 75 |
| Macrobend loss (dB/turn on 20 mm diameter mandrel) | 0.5 | <0.3 | <0.2 | <0.2 | <0.2 | <0.2 | <0.2 | <0.2 |
| Zero dispersion wavelength, $\lambda_0$ (nm) | 1308 | 1304 | 1302 | 1302 | 1303 | 1300 | 1302 | 1304 |
| Cable Cutoff (nm) | 1177 | 1199 | 1230 | 1260 | 1219 | 1257 | 1258 | 1260 |
| MACC (MFD at 1310 nm/Cable Cutoff in microns) | 7.80 | 7.65 | 7.48 | 7.30 | 7.55 | 7.28 | 7.15 | 6.97 |

TABLE 1B

| Parameter | Example 8 | Example 9 | Example 10 | Example 11 | Example 12 | Example 13 | Example 14 | Example 15 |
|---|---|---|---|---|---|---|---|---|
| $\Delta 1 max$ (%) | 0.39 | 0.40 | 0.40 | 0.40 | 0.40 | 0.40 | 0.40 | 0.40 |
| R1 (micron) | 4.20 | 6.0 | 6.0 | 6.0 | 6.0 | 5.5 | 6.0 | 6.0 |
| Alpha-1 | 20 | 2 | 2 | 2 | 2 | 2 | 2 | 2 |
| R2 (micron) | 10 | 10 | 10 | 10 | 10 | 10 | 10 | 10 |
| R1/R2 | 0.42 | 0.60 | 0.60 | 0.60 | 0.60 | 0.55 | 0.60 | 0.60 |
| $\Delta 2$ (%) | 0.00 | 0.00 | −0.02 | −0.02 | −0.02 | 0.02 | −0.02 | 0.02 |
| Alpha-2 | 20 | 20 | 20 | 20 | 20 | 20 | 20 | 20 |
| R3 (micron) | 20 | 16 | 16 | 16 | 20 | 20 | 20 | 20 |
| $\Delta 3$ (%) | −0.05 | −0.05 | −0.05 | −0.09 | −0.05 | −0.05 | −0.03 | −0.03 |
| V3 (% micron$^2$, in absolute magnitude) | 15.0 | 7.8 | 7.8 | 14.0 | 15.0 | 15.0 | 9.0 | 9.0 |
| $\Delta 4$ (%) | 0.00 | 0.00 | 0.00 | 0.00 | 0.00 | 0.00 | 0.00 | 0.00 |
| V4 (% micron$^2$, in absolute magnitude) | 25.0 | 32.2 | 32.2 | 58.0 | 25.0 | 25.0 | 15.0 | 15.0 |
| R4 (micron) | 62.5 | 62.5 | 62.5 | 62.5 | 62.5 | 62.5 | 62.5 | 62.5 |
| Cutoff LP01 (nm) | 3480 | 4630 | 3990 | 3265 | 3330 | 3770 | 3896 | 5000 |
| Cutoff LP11 (nm) | 1292 | 1326 | 1269 | 1261 | 1267 | 1315 | 1274 | 1403 |
| Dispersion 1310 nm (ps/nm/km) | −0.030 | −0.195 | −0.162 | −0.054 | −0.160 | −1.152 | −0.223 | −0.283 |
| Dispersion Slope 1310 nm (ps/nm$^2$/km) | 0.086 | 0.091 | 0.090 | 0.091 | 0.090 | 0.090 | 0.0896 | 0.091 |
| Dispersion 1550 nm (ps/nm/km) | 16.69 | 17.49 | 17.40 | 17.68 | 17.42 | 16.54 | 17.25 | 17.46 |
| Dispersion Slope 1550 nm (ps/nm$^2$/km) | 0.058 | 0.062 | 0.061 | 0.062 | 0.061 | 0.062 | 0.061 | 0.062 |
| Attenuation at 1550 nm (dB/km) | 0.19 | 0.19 | 0.19 | 0.19 | 0.19 | 0.19 | 0.19 | 0.19 |
| MFD 1310 nm (micron) | 8.56 | 9.29 | 9.14 | 9.13 | 9.14 | 9.07 | 9.15 | 9.45 |
| MFD 1550 nm (micron) | 9.67 | 10.54 | 10.36 | 10.32 | 10.36 | 10.39 | 10.38 | 10.75 |
| Aeff at 1550 nm (microns$^2$) | 73.4 | 87.3 | 84.3 | 83.6 | 84.3 | 84.8 | 84.6 | 90.8 |
| LLWM at 1550 nm (dB/m) | 0.140 | 0.408 | 0.423 | 0.379 | 0.390 | 0.346 | 0.428 | 0.414 |
| Pin Array at 1550 nm (dB) | 2.73 | 6.36 | 8.27 | 7.60 | 7.61 | 5.60 | 8.21 | 4.79 |
| LLWM % improvement vs. Comparative Example at 1550 nm | 74 | 26 | 23 | 31 | 29 | 37 | 22 | 25 |
| Pin Array % improvement vs. Comparative Example at 1550 nm | 70 | 31 | 10 | 17 | 17 | 39 | 10 | 48 |
| Macrobend loss (dB/turn on 20 mm diameter mandrel) | <0.2 | <0.2 | <0.4 | <0.3 | <0.2 | <0.2 | <0.3 | <0.4 |
| Zero dispersion wavelength, $\lambda_0$ (nm) | 1310 | 1312 | 1312 | 1311 | 1312 | 1323 | 1312 | 1313 |
| Cable Cutoff (nm) | 1218 | 1249 | 1249 | 1260 | 1260 | 1156 | 1252 | 1252 |
| MACC (MFD at 1310 nm/Cable Cutoff in microns) | 7.03 | 7.44 | 7.32 | 7.25 | 7.25 | 7.85 | 7.31 | 7.55 |

TABLE 1C

| Parameter | Example 16 | Example 17 | Example 18 | Example 19 | Example 20 | Example 21 | Example 22 | Example 23 |
|---|---|---|---|---|---|---|---|---|
| $\Delta 1 max$ (%) | 0.39 | 0.39 | 0.37 | 0.40 | 0.42 | 0.42 | 0.40 | 0.40 |
| R1 (micron) | 4.20 | 4.20 | 4.50 | 6.0 | 5.8 | 5.5 | 5.5 | 5.5 |
| Alpha-1 | 20 | 20 | 20 | 2 | 2 | 2 | 2 | 2 |
| R2 (micron) | 10 | 12 | 8 | 8 | 8 | 8 | 7 | 7 |
| R1/R2 | 0.42 | 0.35 | 0.56 | 0.75 | 0.73 | 0.69 | 0.79 | 0.79 |
| $\Delta 2$ (%) | 0.00 | 0.00 | 0.00 | 0.02 | 0.02 | 0.02 | 0.05 | 0.05 |
| Alpha-2 | 20 | 20 | 20 | 20 | 20 | 20 | 20 | 20 |
| R3 (micron) | 20 | 22 | 18 | 18 | 18 | 14 | 14 | 14 |
| $\Delta 3$ (%) | −0.03 | −0.03 | −0.03 | −0.03 | −0.03 | −0.05 | −0.05 | −0.04 |
| V3 (% micron$^2$, in absolute magnitude) | 9.0 | 10.2 | 7.8 | 7.8 | 7.8 | 6.6 | 7.4 | 5.9 |
| $\Delta 4$ (%) | 0.00 | 0.00 | 0.00 | 0.00 | 0.00 | 0.00 | 0.00 | 0.00 |
| V4 (% micron$^2$, in absolute magnitude) | 15.0 | 12.5 | 17.3 | 17.3 | 17.3 | 35.2 | 35.2 | 28.2 |

TABLE 1C-continued

| Parameter | Example 16 | Example 17 | Example 18 | Example 19 | Example 20 | Example 21 | Example 22 | Example 23 |
|---|---|---|---|---|---|---|---|---|
| R4 (micron) | 62.5 | 62.5 | 62.5 | 62.5 | 62.5 | 62.5 | 62.5 | 62.5 |
| Cutoff LP01 (nm) | 4136 | 4077 | 4512 | 5000 | 5000 | 4869 | 4740 | 5000 |
| Cutoff LP11 (nm) | 1297 | 1303 | 1338 | 1370 | 1361 | 1287 | 1301 | 1313 |
| Dispersion 1310 nm (ps/nm/km) | −0.115 | −0.173 | 0.856 | 0.035 | −0.301 | −0.717 | −0.041 | −0.168 |
| Dispersion Slope 1310 nm (ps/nm$^2$/km) | 0.086 | 0.086 | 0.087 | 0.0911 | 0.091 | 0.091 | 0.092 | 0.091 |
| Dispersion 1550 nm (ps/nm/km) | 16.53 | 16.38 | 17.8 | 17.82 | 17.43 | 17.02 | 17.80 | 17.64 |
| Dispersion Slope 1550 nm (ps/nm$^2$/km) | 0.058 | 0.057 | 0.059 | 0.062 | 0.062 | 0.062 | 0.062 | 0.062 |
| Attenuation at 1550 nm (dB/km) | 0.19 | 0.19 | 0.19 | 0.19 | 0.19 | 0.19 | 0.19 | 0.19 |
| MFD 1310 nm (micron) | 8.57 | 8.58 | 8.92 | 9.40 | 9.15 | 9.01 | 9.27 | 9.29 |
| MFD 1550 nm (micron) | 9.7 | 9.72 | 10 | 10.63 | 10.37 | 10.25 | 10.48 | 10.53 |
| Aeff at 1550 nm (microns$^2$) | 73.9 | 74.2 | 78.5 | 88.7 | 84.5 | 82.5 | 86.3 | 87.1 |
| LLWM at 1550 nm (dB/m) | 0.158 | 0.161 | 0.180 | 0.371 | 0.262 | 0.341 | 0.427 | 0.451 |
| Pin Array at 1550 nm (dB) | 3.04 | 3.03 | 2.98 | 4.91 | 3.72 | 6.31 | 7.30 | 7.36 |
| LLWM % improvement vs. Comparative Example at 1550 nm | 71 | 71 | 67 | 32 | 52 | 38 | 22 | 18 |
| Pin Array % improvement vs. Comparative Example at 1550 nm | 67 | 67 | 67 | 46 | 59 | 31 | 20 | 20 |
| Macrobend loss (dB/turn on 20 mm diameter mandrel) | <0.4 | <0.2 | <0.2 | <0.2 | <0.4 | <0.3 | <0.3 | <0.4 |
| Zero dispersion wavelength, $\lambda_0$ (nm) | 1311 | 1312 | 1300 | 1310 | 1313 | 1318 | 1310 | 1312 |
| Cable Cutoff (nm) | 1201 | 1205 | 1255 | 1249 | 1237 | 1163 | 1135 | 1130 |
| MACC (MFD at 1310 nm/Cable Cutoff in microns) | 7.14 | 7.12 | 7.11 | 7.53 | 7.40 | 7.75 | 8.17 | 8.22 |

The core (region 1, center to $r_1$) can be made by silica doped with $GeO_2$ or other low loss updopants. The core can have an alpha profile. Region 2 silica or silica doped with $GeO_2$ or F or other low loss dopants. The low index trench ($r_3$–$r_2$), or region 3, can be made with fluorine doped silica or can be made of silica. The outer cladding ($r_4$–$r_3$) or region 4, can be pure silica or silica doped with an updopant such as $Cl_2$ (Cl), $Br_2$ (Br), $GeO_2$, $Al_2O_3$, $TiO_2$, $P_2O_5$, $Nb_2O_5$, etc. In some cases region 2 can have an alpha profile. Doping of the different regions can be done in: 1) laydown (OVD, VAD, MCVD or PCVD) using as updopants for example, $GeCl_4$, $SiCl_4$, $TiCl_4$, $AlCl_3$, $POCl_3$, or $PCl_3$ and combinations thereof or, 2) in a consolidation furnace during the drying/doping and sintering of a soot preform using as updopants for example, $Cl_2$, $Br_2$, $GeCl_4$, $SiCl_4$, $TiCl_4$, $AlCl_3$, $POCl_3$, or $PCl_3$ and combinations thereof. The most preferred updopant in region 4 is chlorine-doped $SiO_2$.

The invention is further illustrated through following examples. Fiber designs with trench offset from the core (i.e, the inner cladding 3 is not directly adjacent to the core 1, but has at least one other inner cladding region situated therebetween, see Table 1, for example) are disclosed here that result in fibers having optical properties that are G.652 compliant. The trench is made either by down-doping the region 3 or by updoping the outer cladding region 4 (i.e., the overclad). The offset trench allows more and better control of fiber dispersion. The microbending loss (as defined by lateral load measurement, LLWM) is greater than about 15% lower and up to about 75% lower than the corresponding loss in non-trench fibers (Comparative Example), i.e., 15% or 75% reduction in microbending loss. Use of glass fibers that have lower microbending loss advantageously allow for utilization of lower cost primary coatings. (It is noted, that typical fibers that need good microbend performance do not use these coatings because usually the lower cost primary coatings have higher moduli (typically higher than 0.7 MPa), and thus they do not provide as good of microbend performance).

MFD is between about 8.5 and 9.5 microns at 1310 nm, zero dispersion wavelength between 1300 and 1324 nm, cable cutoff less than 1260 nm and microbending loss that is greater than about 15% and up to 75% lower than the corresponding microbending loss in non-trench fibers (Comparative Example). The trench (inner cladding 3) index delta with respect to the overclad 4 is between −0.02% and −0.09% (i.e., 0.02%≤$\Delta_4$–$\Delta_3$≤0.09%); this helps to provide better microbending (LLWM) loss verses a comparative example without a trench. The absolute volume of the trench is between about 1 and 45, (in some embodiments, more preferably 5 to 35)%μm$^2$. The trench is made either by down doping the trench region or by updoping the overclad. The volume $V_3$ of the trench corresponding to the third annular region 3 is defined herein being calculated using $\Delta_{(4-3)}$ between radius $r_2$ and $r_3$ and thus is defined as the absolute volume (see Eq. 2).

The first inner cladding (region 2) comprising $\Delta_2$ from radius $r_1$ to $r_2$ and where $\Delta_2$–$\Delta_3$≥0.01% enables optical fiber designs with improved microbending performance to have dispersion properties which are G.652 standards compliant (1300 nm≤$\lambda_o$≤1324 nm).

In some embodiments, the refractive index $\Delta_4$ of the outer cladding region is greater than 0.01%, more preferably greater than 0.02%, when compared to that of the inner cladding region 2. In some embodiments, the outer annular region 4 comprises chlorine (Cl) in an amount greater than 1000 ppm, more preferably greater than 1500 ppm, and most preferably greater than 2000 ppm (0.2%) by weight. In some embodiments 2000 ppm (wt.)≤Cl≤12,000 ppm (wt.). In other embodiments 2000 ppm (wt.)≤Cl≤6,000 (wt.).

Fiber Examples 24-25

Table 2 below list characteristics of illustrative exemplary embodiments 24-25 with relative refractive index profile similar to that shown in FIG. 2. Optical fibers of FIG. 2 are similar to those of FIG. 1 in that that they have a trench (region 3) offset from the core (region 1) with the inner cladding region 2 situated there between. However, in FIG. 2 embodiments the fibers also comprise region 2A situated directly adjacent to the core and sandwiched between the core (region 1) and the inner cladding region 2. More specifically, FIG. 2 shows illustrates the refractive index profile that has 5 segments: a central core (region 1) and four surrounding cladding layers (inner cladding layers 2A, 2 and 3 and an outer cladding 4 that in these embodiments with the refractive index delta $\Delta_4$ (i.e., the overclad). The core can have a step index or an alpha profile. The first layer surrounding the core can have a flat index or an alpha profile. The relative refractive indices, □$\Delta_1$, $\Delta_{2A}$, $\Delta_2$, $\Delta_3$, $\Delta_4$, and the radii $r_1$, $r_{2A}$, $r_2$, $r_3$, $r_4$ can be adjusted to get different fiber optical properties. In these embodiments a trench (region 3) is used in order to improve the fiber dispersion properties while maintaining low microbend losses.

In particular, set forth below for each example is the refractive index delta $\Delta_{1max}$, having an $alpha_1$ and outer radius $R_1$ of the central core region 1, refractive index deltas $\Delta_{2A}$ and an outer radius $r_{2a}$, and $\Delta_2$ as well as the outer radius $R_2$ inner cladding region 2, refractive index delta $\Delta_3$ and volume $V_3$ of the cladding region 3, which is calculated between inner radius $R_2$ of outer cladding region 3, and between the refractive index $\Delta_4$ and that of $\Delta_3$; and the value volume $V_4$ of the cladding region 4 which is calculated between inner radius $R_3$ and a radial distance of 30 microns, respectively. Also set forth are theoretical cutoff wavelength in nm of LP01 and LP11 modes, mode field diameter in microns at 1310 nm, chromatic dispersion at 1310 nm in (ps/nm/km), dispersion slope at 1310 nm in (ps/nm²/km), zero dispersion wavelength, $\lambda_0$ in (nm), mode field diameter at 1550 nm in microns, chromatic dispersion at 1550 nm (ps/nm/km), dispersion slope at 1550 nm in (ps/nm²/km), attenuation at 1550 nm in dB/km, Cable (22 m) cutoff in (nm), MACC (MFD at 1310 nm/Cable Cutoff in microns), LLWM at 1550 nm in dB/m, LLWM % improvement vs. Comparative Example in Table 1 at 1550 nm. In Table 2, these properties are modeled.

TABLE 2

| Parameter | Example 25 | Example 26 |
|---|---|---|
| Δ1 max (%) | 0.39 | 0.40 |
| R1 (micron) | 4.3 | 4.4 |
| Core Alpha | 20 | 20 |
| Δ2a (%) | 0.00 | 0.00 |
| R2a (micron) | 5.45 | 5.45 |
| Δ2 (%) | 0.15 | 0.20 |
| R2 (micron) | 6.90 | 6.90 |
| Δ3 (%) | 0.00 | 0.00 |
| R3 (micron) | 13.3 | 10.0 |
| V3 (% micron², in absolute magnitude) | 5.2 | 2.6 |
| Δ4 (%) | 0.04 | 0.05 |
| R4 (micron) | 62.5 | 62.5 |
| V4 (% micron², in absolute magnitude) | 28.9 | 40.0 |
| Cutoff LP01 (nm) | >3000 | >3000 |
| Cutoff LP11 (nm) | 1235 | 1281 |
| Dispersion 1310 nm (ps/nm/km) | −0.281 | −0.078 |
| Dispersion Slope 1310 nm (ps/nm²/km) | 0.087 | 0.088 |
| Dispersion 1550 nm (ps/nm/km) | 16.7 | 16.9 |
| Dispersion Slope 1550 nm (ps/nm²/km) | 0.059 | 0.059 |
| Attenuation at 1550 nm (dB/km) | 0.19 | 0.19 |
| MFD 1310 nm (micron) | 8.90 | 9.00 |
| MFD 1550 nm (micron) | 10.10 | 10.19 |
| LLWM at 1550 nm (dB/m) | 0.469 | 0.449 |
| LLWM % improvement vs Comparative Example at 1550 nm | 15 | 18 |
| Zero dispersion wavelength, $\lambda_0$ (nm) | 1313 | 1311 |
| Cable Cutoff (nm) | 1220 | 1220 |
| MACC (MFD at 1310 nm/Cable Cutoff in microns) | 7.29 | 7.38 |

Fiber designs with trench offset from the core that are disclosed in Table 2 have optical properties that are G.652 compliant, MFD is between about 8.5 and 9.4 microns at 1310 nm, zero dispersion wavelength between 1300 and 1324 nm, cable cutoff less than 1260 nm and microbending loss that is up to 22% reduction than the corresponding microbending loss in non-trench fibers. The trench index (inner cladding region 3) with respect to the overclad is between −0.01% and −0.09%, with absolute volume of the trench is between about 1 and 45, (in some embodiments, more preferably 1 to 35) The trench adjacent to the core is made either by down doping the trench region or by updoping the overclad. The volume $V_4$ of the forth annular region 4, is defined herein being calculated using Eq. 4.

The offset trench (inner cladding region 3) index delta with respect to the overclad 4 is between −0.02% and −0.09% (i.e., 0.02%≤$\Delta_4$−$\Delta_3$≤0.09%); this helps to provide better microbending (LLWM) loss verses a comparative example without a trench The first inner cladding (region 2) comprising $\Delta_2$ from radius $r_1$ to $r_2$ and where $\Delta_2$−$\Delta_3$≥0.01% enables optical fiber designs with improved microbending performance to have dispersion properties which are G.652 standards compliant (1300 nm≤$\lambda_o$≤1324 nm).

As can be seen in both of Tables 1 and 2 above, the examples herein illustrate exemplary fibers which employ a central glass core region having index $\Delta_1$ and a maximum refractive index delta percent $\Delta_{1max}$, a first inner cladding region having index $\Delta_2$, and an outer cladding region having index $\Delta_4$; wherein $\Delta_{1max}$>$\Delta_4$, $\Delta_2$>$\Delta_3$, and $\Delta_3$<$\Delta_4$, wherein the difference between $\Delta_3$ and $\Delta_2$ is greater than or equal to 0.01% and a absolute value of profile volume, |$V_3$| is at least 5%µm². These fibers exhibit a cable cutoff less than or equal to 1260 nm and a bend loss of less than 0.75 dB/turn when wound upon on a 20 mm diameter mandrel. These fibers also exhibit a mode field diameter between about 8.2 and 9.5 microns at 1310 nm, a zero dispersion wavelength between 1300 and 1324 nm, a dispersion slope at 1310 nm which is less than 0.09 ps/nm²/km). Many of these fibers also exhibit a bend loss at 1550 nm, when wound upon on a 20 mm diameter mandrel, of less than 0.75 dB/turn, more preferably less than 0.4 dB/turn, even more preferably less than 0.3 dB/turn and some fibers most preferably less than 0.2 dB/turn. These fibers also exhibit a bend loss at 1550 nm, when wound upon on a 30 mm diameter mandrel, of less than 0.025 dB/turn, and some fibers more preferably less than 0.003 dB/turn. Some of these examples employ chlorine in the outer cladding region in an amount greater than 2000 ppm, and in some cases greater than 3000 or even greater than 4000 ppm by weight.

Attenuation (spectral) at 1550 nm is preferably less than 0.21 dB/km, more preferably less than 0.20 dB/km, even more preferably less than 0.197 dB/km and most preferably less than or equal to 0.191 dB/km.

Thus, the optical fibers described herein provide outstanding bending performance, and additionally provide cutoff wavelengths suitable for single mode operation at wavelengths greater than about 1260 nm and a zero dispersion wavelength 4 such that 1300 nm≤$\lambda_0$≤1324 nm.

In some embodiments, the core may comprise a relative refractive index profile having a so-called centerline dip which may occur as a result of one or more optical fiber manufacturing techniques. However, the centerline dip in any of the refractive index profiles disclosed herein is optional.

The optical fiber disclosed herein comprises a core and a cladding layer (or cladding or outermost annular cladding region) surrounding and directly adjacent the core. Preferably, the core is comprised of silica doped with germanium, i.e. germania doped silica. Dopants other than germanium, singly or in combination, may be employed within the core, and particularly at or near the centerline, of the optical fiber disclosed herein to obtain the desired refractive index and density. In preferred embodiments, the core of the optical fiber disclosed herein has a non-negative refractive index profile, more preferably a positive refractive index profile, wherein the core is surrounded by and directly adjacent to a cladding layer.

Preferably, the optical fiber disclosed herein has a silica-based core and cladding. In preferred embodiments, the cladding has an outer diameter, 2·$R_4$, of about 125 μm.

The optical fiber disclosed herein may be surrounded by a protective coating, e.g. a primary coating P contacting and surrounding the outer cladding region 4, the primary coating P having a Young's modulus of less than 1.0 MPa, preferably less than 0.9 MPa, and in preferred embodiments not more than 0.8 MPa (for example 0.8, 0.6, 0.4, 0.2, 0.1 MPa), and further comprises a secondary coating S contacting and surrounding the primary coating P, the secondary coating S having a Young's modulus of greater than 1200 MPa, and in preferred embodiments greater than 1400 MPa.

In some embodiments, the optical fiber disclosed herein may be surrounded by a protective coating, e.g. a primary coating P contacting and surrounding the outer cladding region 4, the primary coating P having a Young's modulus of between 0.7 and 1 MPa, for example between than 0.8 and 1 MPa.

Alternately, the optical fiber disclosed herein may be surrounded by a protective coating, e.g. a primary coating P contacting and surrounding the outer cladding region 3, the primary coating P having a Young's modulus of greater than 1.0 MPa, for example greater than 1.05 MPa, or greater than 1.1 MPa and further comprises a secondary coating S contacting and surrounding the primary coating P, the secondary coating S having a Young's modulus of greater than 1200 MPa, and in preferred embodiments greater than 1400 MPa.

As used herein, the Young's modulus, elongation to break, and tensile strength of a cured polymeric material of a primary coating is measured using a tensile testing instrument (e.g., a Sintech MTS Tensile Tester, or an INSTRON Universal Material Test System) on a sample of a material shaped as a film between about 0.003" (76 μm) and 0.004" (102 μm) in thickness and about 1.3 cm in width, with a gauge length of 5.1 cm, and a test speed of 2.5 cm/min.

Additional description of suitable primary and secondary coatings can be found in PCT Publication WO2005/010589 which is incorporated herein by reference in its entirety.

Preferably, the optical fibers disclosed herein have a low OH content, and preferably have an attenuation curve which exhibits a relatively low, or no, water peak in a particular wavelength region, for example, in the E-band. Methods of producing low water peak optical fiber can be found in PCT Application Publication Numbers WO00/64825, WO01/47822, and WO02/051761, the contents of each being hereby incorporated by reference. The optical fiber disclosed herein preferably has an optical attenuation (spectral) at 1383 nm which is not more than 0.10 dB/km above an optical attenuation at 1310 nm, and more preferably not more than the optical attenuation at 1310 nm. The optical fiber disclosed herein preferably has a maximum hydrogen induced attenuation change of less than 0.03 dB/km at 1383 nm after being subjected to a hydrogen atmosphere, for example 0.01 atm partial pressure hydrogen for at least 144 hours.

A low water peak generally provides lower attenuation losses, particularly for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths. Preferably, a Raman amplifier pumps at one or more wavelengths which are about 100 nm lower than any desired operating wavelength or wavelength region. For example, an optical fiber carrying an operating signal at wavelength of around 1550 nm may be pumped with a Raman amplifier at a pump wavelength of around 1450 nm. Thus, the lower fiber attenuation in the wavelength region from about 1400 nm to about 1500 nm would tend to decrease the pump attenuation and increase the pump efficiency, e.g. gain per mW of pump power, especially for pump wavelengths around 1400 nm.

The fibers disclosed herein exhibit low PMD values particularly when fabricated with OVD processes. Spinning of the optical fiber may also lower PMD values for the fiber disclosed herein.

It is to be understood that the foregoing description is exemplary only and is intended to provide an overview for the understanding of the nature and character of the fibers which are defined by the claims. The accompanying drawings are included to provide a further understanding of the preferred embodiments and are incorporated and constitute part of this specification. The drawings illustrate various features and embodiments which, together with their description, serve to explain the principals and operation. It will become apparent to those skilled in the art that various modifications to the embodiments as described herein can be made without departing from the spirit or scope of the appended claims.

Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber comprising:
a germania doped central core region having outer radius $r_1$ and refractive index $\Delta_1$, a maximum refractive index $\Delta_{1max}$ and an alpha (α) profile where 1≤α≤100; and
a cladding region comprising (i) a first inner cladding region having an outer radius $r_2$>6 microns and refractive index $\Delta_2$ and 0.3≤$r_1/r_2$≤0.85; (ii) and a second inner cladding region having an outer radius $r_3$>9 microns and comprising refractive index $\Delta_3$; and (iii) an outer cladding region surrounding the inner cladding region and comprising refractive index $\Delta_4$, wherein $\Delta_{1max} > \Delta_4$, $\Delta_2 > \Delta_3$, $\Delta_3 < \Delta_4$, and $0.01\% \leq \Delta_4 - \Delta_3 \leq 0.09\%$, and $0.01\% \leq \Delta_2 - \Delta_3 \leq 0.2\%$, the absolute value $V_3$ of the second inner cladding region is $5\%\mu m^2 \leq V_3 \leq 40\%\mu m^2$, said fiber exhibits a 22 m cable cutoff less than or equal to 1260 nm, and has a zero dispersion wavelength, $\lambda_0$, and 1300 nm $\leq \lambda_0 \leq$ 1324 nm.

2. The optical fiber of claim 1, wherein is $5\%\mu m^2 \leq V_3 \leq 20\%\mu m^2$.

3. The optical fiber of claim 1, wherein is $5\%\mu m^2 \leq V_3 \leq 15\%\mu m^2$.

4. The optical fiber of claim 1, wherein the second inner cladding region satisfies at least one of the following conditions: (i) it contains less than 0.02 wt % fluorine; (ii) it is essentially free of fluorine and germania.

5. The optical fiber of claim 1, wherein $0.02\% \leq \Delta_4 - \Delta_3 \leq 0.06\%$.

6. The optical fiber of claim 1, wherein $\Delta_4 > \Delta_3$ for a length extending from $r_3$ to a radius of at least 30 microns.

7. The optical fiber of claim 1, wherein $0.33 \leq r_1/r_2$.

8. The optical fiber of claim 1, wherein the profile volume, $V_4$ of the outer cladding region, calculated between the outer radius of the second inner cladding region and a radial distance of 30 μm, is equal to:

$$V_4 = 2 \int_{r3}^{r30} \Delta_{(4-3)}(r) r \, dr$$

and $|V_4|$ is at least $5\%\mu m^2$.

9. The optical fiber of claim 1, wherein said fiber exhibits a bend loss of less than 0.75 dB/turn when wound upon on a 20 mm radius mandrel and exhibits a MACC number between 6.6 and 8.3.

10. The optical fiber of claim 1, wherein the width of second inner cladding region $r_3 - r_2$ is between 3 and 13 microns.

11. The optical fiber of claim 9, wherein said fiber exhibits a bend loss of less than 0.5 dB/turn when wound upon on a 20 mm radius mandrel.

12. A single mode optical fiber comprising
(I) a central core region having outer radius $r_1$ and refractive index $\Delta_1$, a maximum refractive index $\Delta_{1max}$ and an alpha ($\alpha$) profile where $1 \leq \alpha \leq 100$; and (II) a cladding region comprising (i) a first inner cladding region having an outer radius $r_2 > 6$ microns and refractive index $\Delta_2$ and $0.3 \leq r_1/r_2 \leq 0.85$; (ii) and a second inner cladding region having an outer radius $r_3 > 9$ microns and comprising refractive index $\Delta_3$; and (iii) an outer cladding region surrounding the inner cladding region and comprising refractive index $\Delta_4$, wherein $\Delta_{1max} > \Delta_4$, $\Delta_2 > \Delta_3$, $\Delta_3 < \Delta_4$, wherein $0.32\% \leq \Delta_{1max} \leq 0.45\%$, $0.01\% \leq \Delta_2 - \Delta_3 \leq 0.2\%$, and $0.01\% \leq \Delta_4 - \Delta_3 \leq 0.09\%$, the absolute value $V_3$ of the second inner cladding region is $5\%\mu m^2 \leq V_3 \leq 40\%\mu m^2$.

13. The fiber of claim 12, wherein said core comprises germania-doped silica.

14. The fiber of claim 12, wherein said core contains less than 2 wt percent Germania.

15. The fiber of claim 12, wherein said fiber exhibits a 22 m cable cutoff less than or equal to 1260 nm.

16. The optical fiber of claim 12, wherein the profile volume, $V_4$ of the outer cladding region, calculated between the outer radius of the second inner cladding region and a radial distance of 30 μm, is equal to:

$$V_4 = 2 \int_{r3}^{r30} \Delta_{(4-3)}(r) r \, dr$$

and $|V_4|$ is $\geq 5\%\mu m^2$.

17. The optical fiber of claim 12, wherein said fiber exhibits a bend loss of less than 0.75 dB/turn when wound upon on a 20 mm radius mandrel and exhibits a MACC number between 6.6 and 8.3.

18. The optical fiber of claim 12, wherein the width of first inner cladding region $r_2 - r_1$ is between 1.5 and 11 microns.

19. The optical fiber of claim 12, wherein the width of second cladding region $r_3 - r_2$ is between 3 and 13 microns.

20. The optical fiber of claim 12, wherein said fiber exhibits a 22 m cable cutoff less than or equal to 1260 nm, and has a zero dispersion wavelength, $\lambda_0$, and 1300 nm $\leq \lambda_0 \leq$ 1324 nm.

21. The optical fiber of claim 1, wherein $0.02\% \leq \Delta_4 - \Delta_3 \leq 0.09\%$, and is $5\%\mu m^2 \leq V_3 \leq 20\%\mu m^2$.

22. The optical fiber of claim 1, wherein the first and or second inner cladding region comprises fluorine doped silica.

23. The optical fiber of claim 10, wherein $0.03\% \leq \Delta_2 - \Delta_3 \leq 0.2$.

24. The optical fiber of claim 10, wherein LLWM at 1550 nm is less than or equal to 0.45 dB/m.

25. The optical fiber of claim 10, pin array loss 1550 nm in dB/m is less than 9 dB.

* * * * *